(12) United States Patent
Davidson et al.

(10) Patent No.: US 6,539,771 B1
(45) Date of Patent: Apr. 1, 2003

(54) SEAT SENSOR CALIBRATION METHOD AND SYSTEM

(75) Inventors: Steven Lee Davidson, Carmel, IN (US); Timothy Dean Garner, Kokomo, IN (US); Samuel Joseph Parr, Kokomo, IN (US); Ronald Lee Anderson, Kokomo, IN (US); Keith Kendell Roberts, Noblesville, IN (US); James O Anderson, Atlanta, IN (US)

(73) Assignee: Delphi Technologies, Inc., Troy, MI (US)

( * ) Notice: Subject to any disclaimer, the term of this patent is extended or adjusted under 35 U.S.C. 154(b) by 330 days.

(21) Appl. No.: 09/768,691

(22) Filed: Oct. 11, 2000

Related U.S. Application Data
(60) Provisional application No. 60/203,768, filed on May 12, 2000.

(51) Int. Cl.[7] ............................................... G01G 19/52
(52) U.S. Cl. ......................................................... 73/1.13
(58) Field of Search ................................. 73/1.08, 1.13, 73/1.15, 865.3, 866.4

(56) References Cited

U.S. PATENT DOCUMENTS

| | | | | |
|---|---|---|---|---|
| 4,592,371 A | * | 6/1986 | Pellicano et al. | ...... 73/862.581 |
| 5,373,747 A | * | 12/1994 | Ogawa et al. | ......... 73/862.581 |
| 5,900,591 A | * | 5/1999 | Liubakka | ..................... 73/1.13 |
| 5,942,695 A | * | 8/1999 | Verma et al. | ................. 73/768 |

* cited by examiner

Primary Examiner—Robert Raevis
(74) Attorney, Agent, or Firm—Robert M. Sigler; Jimmy L. Funke

(57) ABSTRACT

An air bag calibrator that is used to calibrate a plurality of seat sensors within a seat simultaneously. The calibrator uses controlled pressure contained within an air bladder and an air press cylinder to apply a controlled force across an entire seat surface that actuates all of the seat sensors in a consistent and repeatable manner, a major improvement over existing seat calibration methods. This is accomplished by loading a seat onto the calibrator, recording a baseline seat sensor value for each of the seat sensors, extending the air press cylinder to an extended position and applying a controlled force across the entire seat surface. The air pressure in the air bladder is then increased or decreased to a target pressure for a predetermined time, at which time an actuated seat sensor values for each of the seat sensors is recorded. A PODS controller in contained within the seat that is used for controlling the deployment of air bags in a crash situation is then calibrated as a function of the recorded baseline seat sensor values and the actuated seat sensor values.

22 Claims, 3 Drawing Sheets

SEAT SENSOR CALIBRATION METHOD AND SYSTEM

CROSS REFERENCE TO RELATED APPLICATION

This application claims priority from provisional application Ser. No. 60/203,768 filed May 12, 2000.

TECHNICAL FIELD

The present invention relates generally to automotive systems and more particularly to seat sensor calibration methods and systems.

BACKGROUND OF THE INVENTION

Recently, automotive manufacturers have developed Passenger Occupant Detection Systems (PODS) to aid in the decision making for deploying passenger side air bags.

Typically, these systems consist of a flexible laminate mat with printed resistors and cylindrical force concentrators. The force concentrators (FCDs) are bonded to the sensor mat over the printed resistors. The sensor mat is placed in the passenger seat between the seat foam and seat trim cover. When the surface of the seat is depressed, the sensor mat and printed resistors will wrap around the force concentrators, which creates a change in the circuit resistance. Based upon the pattern and the weight of the depression, the PODS system can determine whether or not to deploy the passenger side air bag in a crash situation.

PODS sensors must be calibrated in order to obtain optimal performance. There are several variables that can affect sensor performance, including material considerations associated with the seat and sensor components, product material or process variations, and crack preconditioning process. As a result of the multiple sources of variation, the PODS sensors must be calibrated after the seat bottom has been assembled.

The goal of the calibration is to quantify performance of the PODS when a load is applied to the seat surface. The basic calibration steps are to measure a sensor's value in an unloaded state, apply a known load to the seat surface, and record the sensor value in the loaded state. The sensor performance data and the seat model information is then used to calculate the sensitivity of the sensors. The challenge has been to develop a method for applying the load to a seat that produces more reliable, repeatable, and realistic calibration data.

There have been several methods and pieces of equipment used in an attempt to acquire good PODS calibrations. One method focuses on applying a known force to each seat sensor. The seat is contacted with a flat 1.25" diameter swivel pad usually made of steel or delrin material. The system uses a robotic motorized Z-axis to apply force to the seat. A force sensor integrated into the Z-axis monitors the applied force. The Z-axis drives into the seat until the desired force level is achieved. While the system provides acceptable laboratory results, additional testing uncovered problems controlling the force that was applied to the seat surface. Noise tended to generate erroneous force readings. The serving nature of the robot's Z-axis also introduced instabilities to force sensor values. Finally, the system exhibited sensor registration problems associated with off-center contact on the seat sensor and non-uniform and non-planar seat foam compression.

New concepts were developed in response to the problems associated with the original calibrators. An air spring assembly was implemented to design the force sensor out of the system. The air spring produces constant force over its entire length of travel. Because of this fact, the robot is able to drive the Z-axis to a nominal depth and be certain of contacting the seat with known force regardless of the height variation of the seat surface.

In response to the registration issues, the steel/delrin swivel pad was replaced with a 6" urethane-nylon laminate air bladder. Testing concluded that contacting the seat with a flaccid air bladder would produce acceptable sensitivity to seat sensor registration, allowing mis-registration up to +/−25 mm without adversely affecting the sensor values. Further, the air bladder is able to conform to non-planar surfaces and non-perpendicular surfaces, such as sensor locations in seat bolsters.

However, while the air bladder created certain improvements, it also created additional problems. Assuming the contact force is always the same, the pressure on the seat surface would be fairly repeatable from seat sensor to seat sensor and machine to machine. With the air bladder design, however, the contact area was a function of the amount of air trapped in the bladder, the size of the bladder, air temperature, and the seat surface contour.

Methods were created to attempt to define and control these parameters. One method was to fill the bladder to a predefined pressure while pressing the bladder against a flat and rigid surface under a known force. Another method was to fill the bladder to a pre-determined height while pressing the bladder against a flat and rigid surface under a known force. These set-up methods attempted to control the amount of air in the air bladder, but did not solve production problems on non-planar seat surfaces and did not directly control the air bladder pressure.

Other calibration methods were attempted, and all of the methods possessed several common weaknesses. First, because all of the methods were single point calibrators, only one seat sensor could be calibrated at one time. As a result, it could take 2 to 4 minutes to calibrate a single-seat.

Second, testing indicated that a seat sensor's final position could move upwards of +/−35 mm from its nominal position due to uncontrollable seat assembly process and the nature of the materials used to construct the seat. Off-center actuation of the seat sensors produced unrepeatable and unreliable calibration date.

Third, since air was trapped in the 6" diameter bladder, ambient temperature changes resulted in pressure changes within the air bladder, resulting in inaccurate sensor readings.

Fourth, integration of the robotic calibrators into different manufacturing lines for use on a wide variety of seat models, seat manufactures, and seat assembly processes would require custom calibration solutions in almost every instance.

Fifth, setting up, controlling, and monitoring process parameters was extremely difficult and time consuming. The interdependentness of air spring force and air bladder volume process parameters would require adjustments in an iterative manner to bring them within limits. In addition, it would be difficult to create a "transfer" standard that could be used to validate the operation of all machines.

As a result, a need exists for an improved method and system for calibrating seat sensors that produces reliable and repeatable results in a simple and efficient manner.

SUMMARY OF THE INVENTION

While the above methods for calibration focused on applying a controlled force to each seat sensor position with a different apparatus to contact the seat, the present invention focuses on two premises. First, it will be assumed that seat foam acts as a compressible fluid. Second, the amount of sensor mat wrap around an FCD and glue joint is directly related to seat surface pressure. A higher seat surface pressure would cause more sensor mat wrap thus generating a higher seat sensor value. In short, a consistent surface pressure acting on the seat surface will produce consistent reaction pressure in the seat foam, consistent seat deformation, and consistent and reliable sensor data.

The present invention incorporates these two premises into a calibration device generally referred to herein as a Big Bag Calibrator. On the Big Bag Calibrator, air bladder pressure is monitored and controlled directly. A precision pressure sensor is pneumatically tied to the air bladder and relays pressure information back to a computer. The computer determines whether to add or exhaust air to maintain the target pressure within the bladder. With the Big Bag Calibrator, a controllable pressure is applied to the entire seat surface that actuates all of the seat sensors in a consistent and repeatable manner.

This process eliminates the need for all of the indirect monitoring steps required for the prior art calibrators. Further, the process offers several advantages over the prior art. Since the Big Bag Calibrator tests all seat sensors at one time, the cycle time for testing seat sensors is substantially reduced. The Big Bag Calibrator also is simpler and less expensive to maintain than previous calibrators are. The expensive steel base, robot, servo amplifiers, motion control cards, and related control software are replaced with an inexpensive base and air cylinder. Further savings are realized in associated maintenance, downtime, and training. Further, the Big Bag Calibrator is relatively insensitive to sensor registration because the air bladder extends well beyond the edges of a typical car seat.

Other advantages include the fact that ambient temperature changes would not affect system performance, since the air bladder pressure is controlled directly. Also, the Big Bag Calibrator is easy to integrate into a wide variety of seat models, seat manufacturers, and seat assembly processes. Seats can be calibrated as individual seat bottoms, as full seats, or on a pallet containing a car's full complement of seats. These may be run off a single, machine without significant hardware or software changes. Finally, the Big Bag Calibrator directly and accurately controls the pressure applied to the seat surface, eliminating many unnecessary control problems.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
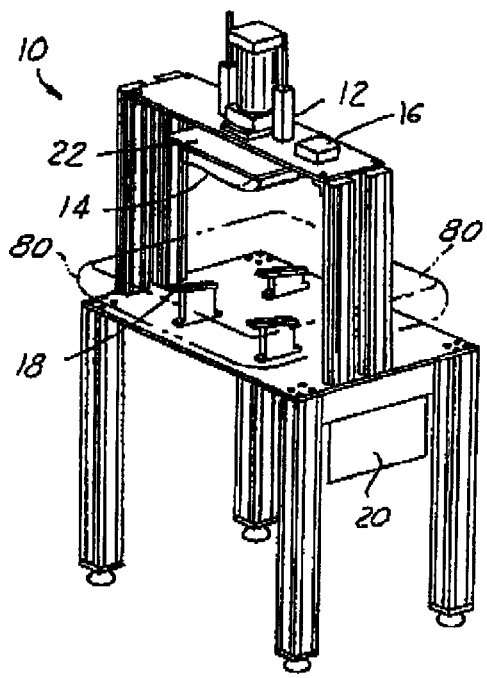
FIG. 1 is a perspective view of a Big Bag Calibrator according to a preferred embodiment of the present invention.

Referring now to FIG. 1, a Big Bag Calibrator 10 is shown having as its major components an air bladder press cylinder 12, an air bladder 14 and an air press plate 22. A digital manometer 16 and a computer 20 are also coupled to the Calibrator 10.

In operation, the air press cylinder 12 moves the air press plate 22 up and out of the way so that a seat (shown as 80 in FIGS. 5–8) can be manually loaded onto a fixture 18. The seat 80 has a PODS controller (not shown) that is electrically coupled with the computer 20 and a plurality of seat sensors (shown as sensor mat 86 in FIGS. 5–8). The PODS controller is used to determine whether to deploy an air bag (not shown) in a crash situation. The use of the PODS controller is described below.

Once the seat 80 is loaded, the air press cylinder 12 then moves the plate 22 and air bladder 14 down on the seat 80. The air press cylinder 12 maintains a force on an air press plate 22. In a preferred embodiment, the air bladder press plate 22 maintains a force of approximately 400 pounds in the extended state to emulate a rigid body. Therefore, when the air bladder 14 is inflated or deflated to the target pressure, the seat 80 and the air bladder 14 are the only components that move.

Figure 5:
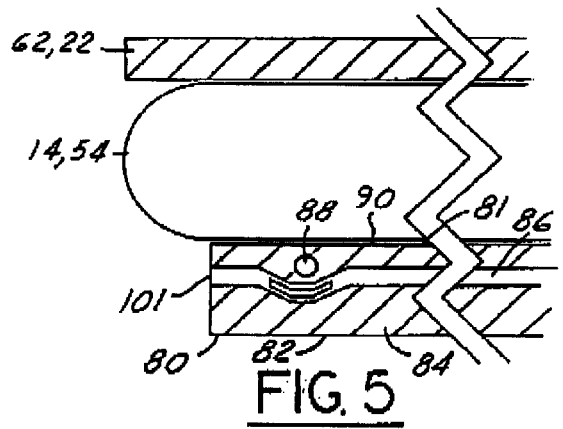
FIG. 5 is a perspective view of one preferred embodiment of a Big Bag Calibrator having a properly positioned air bladder.
Figure 6:
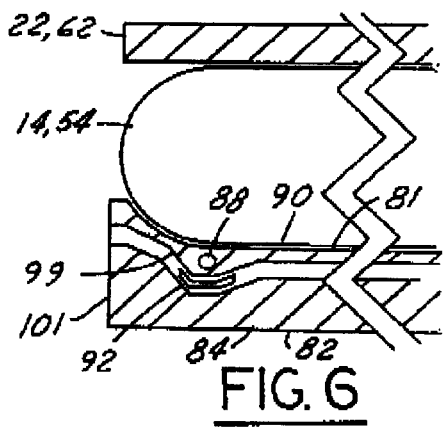
FIG. 6 is a perspective view of FIG. 5 having an improperly positioned air bladder.
Figure 7:
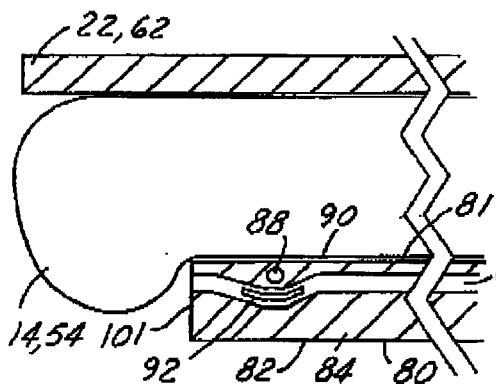
FIG. 7 is a perspective view of FIG. 5 having an improperly positioned air bladder.
Figure 8:
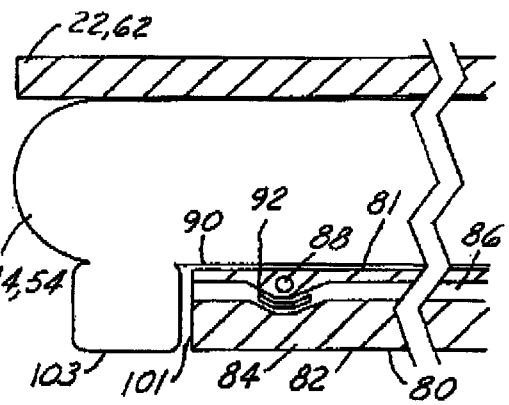
FIG. 8 is a perspective view of another preferred embodiment of the Big Bag Calibrator having a back edge bladder support that remedies the problems associated with an improperly positioned bladder.

The air bladder 14 conforms to the contour of the seat 80 and applies pressure to the seat surface.(shown as 81 on FIGS. 5–8). Preferably, the air bladder 14 is made of a urethane-nylon laminate material to allow the air bladder 14 to slide on the seat surface 81 and provide greater ability to conform to the seat contours. The bladder 14 can range in size from approximately 18" by 24" to 26" by 26". FIGS. 5 and 8 below show two preferred embodiments of configurations for the air bladder 14. The digital manometer 16 preferably has a full scale sensing capability of 0 to 7.22 psi with a typical accuracy of +/−0.5% of Full Scale which translates to 0.0361 psi. Because the manometer 16 has a digital readout, pressure readings are captured and recorded manually.

Figure 2:
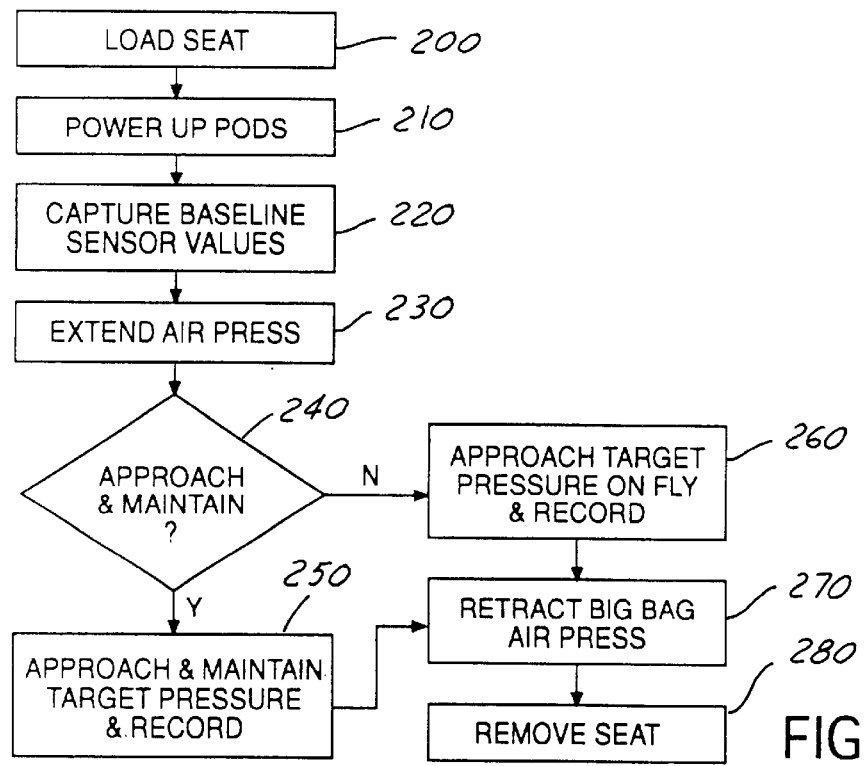
FIG. 2 is a logic flow diagram for the calibrating the seat sensors using a Big Bag Calibrator according to a preferred embodiment of the present invention.

Referring now to FIG. 2, a logic flow diagram with two ramp-up alternatives using a Big Bag Calibrator 10 according to one preferred embodiment of the present invention is shown. In Step 200, a seat 80 is loaded into a fixture 18 underneath the air press assembly 12 and a cable (not shown) is connected with the seat harness (not shown). Next, in Step 210, the PODS controller is powered up. Baseline sensor readings of the plurality of sensors 86 are recorded in the PODS controller in Step 220 prior to applying a load to the seat surface 81. A computer 20, preferably using Pure Imagination's software package Slug Recorder, is connected to the PODS controller. The software package is capable of capturing data from all the seat sensors 86 simultaneously. In the manual process, the data capture process is triggered manually.

In Step 230, the air press cylinder 12 is extended via a manually operated valve (not shown) to its end of travel. The cylinder 12 exerts and maintains a force of approximately 400 lbs. in its extended state. Depending upon the volume of air left in the air bladder 14, a force may be exerted on the seat 80 at this time.

In Step 240, a determination is made as to how to drive the Big Bag to the bladder 14 target pressure. Two options are available. If the operator determines to approach the target pressure and maintain, proceed to Step 250. If the operator determines to approach the target pressure on the fly and record, proceed to step 260.

In Step 250, the air bladder pressure is driven to its target pressure and maintained for a period of approximately 30 seconds within the specified tolerances. At that time, the PODS controller records the actuated sensor values. Typically, when the air press cylinder 12 is extended and the air bladder 14 is contacted to the seat 80 there is usually enough air trapped in the air bladder 14 to generate a pressure greater than the target pressure. As the seat 80 is compressed under the load of the bladder 14, the air pressure in the bladder 14 decreases due to the increase in volume of the air bladder 14. To expedite the process, air is exhausted from the air bladder 14 until the target pressure is achieved. Once the actuated sensor values are recorded, the computer 20 creates a calibration table for the PODS controller that takes into account the baseline sensor values from Step 220 and the actuated sensor values from Step 250 which determine the responsive curve for each sensor. The calibration table is used by the PODS controller to correct raw sensor values. This calibration table is downloaded into the PODS controller memory. The PODS controller then uses the corrected sensor values and deflection pattern information to determine whether to deploy the air bag in crash situations. The logic then proceeds to Step 270.

In Step 260, the process proceeds exactly as in Step 250, with the exception that the actuated sensor values are recorded as soon as the bladder 14 target pressure is achieved, rather than waiting 30 seconds. Once the actuated sensor values are recorded and the calibration table is sent to the PODS controller, proceed to Step 270.

In Step 270, the big bag air press cylinder 12 is retracted, and in Step 280 the seat 80 is removed from the fixture 18 after powering down the PODS controller and disconnecting the cable.

Figure 3A:
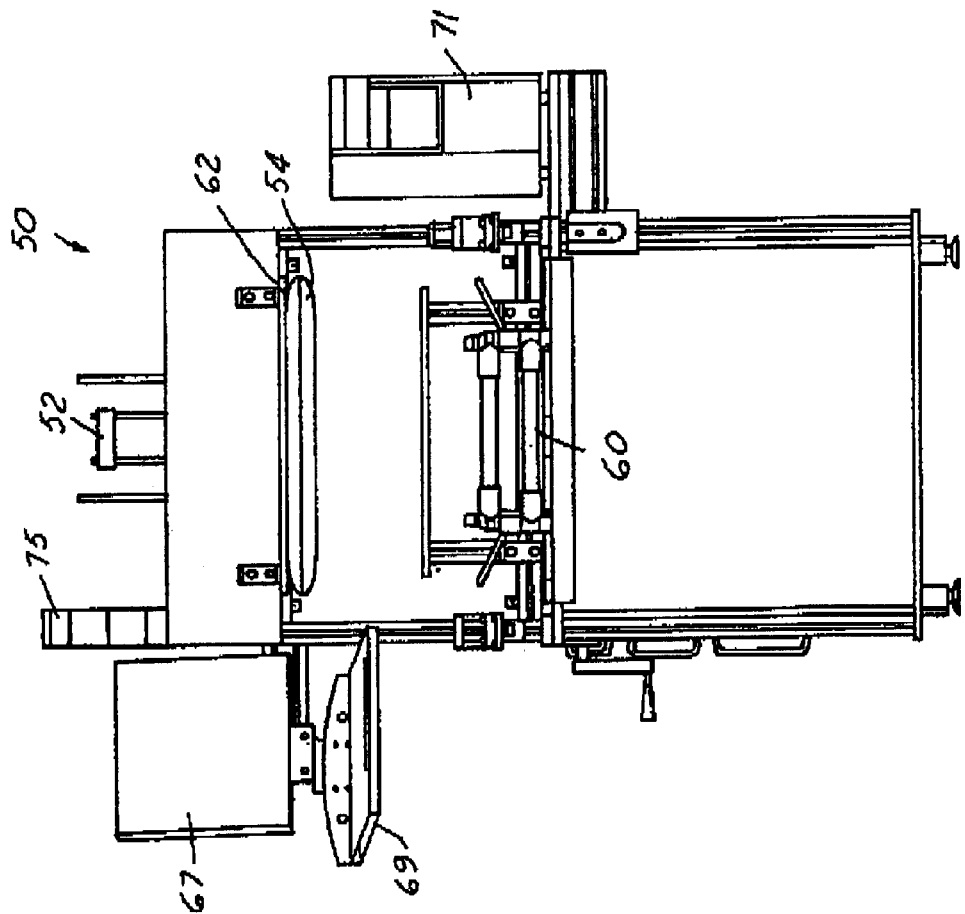
FIGS. 3A and 3B illustrate a front and side perspective view of a Big Bag Calibrator according to another preferred embodiment of the present invention.
Figure 3B:
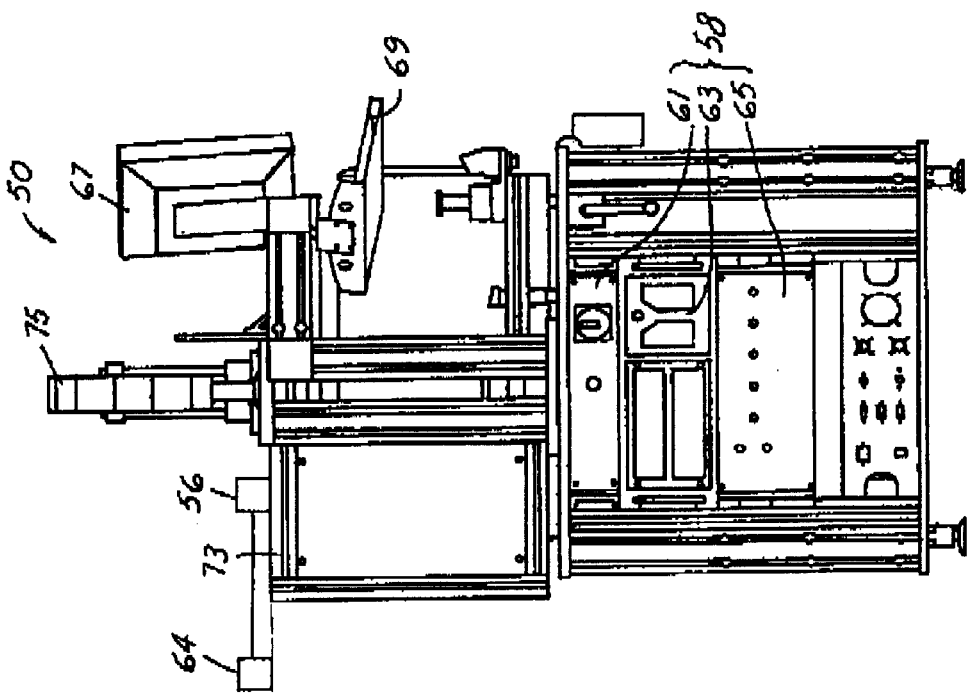

Referring now to FIGS. 3A and 3B, an automated (production) version of the Big Bag Calibrator is depicted in two views. The automated Big Bag Calibrator 50 is shown having as its major components an air bladder press cylinder 52, an air bladder 54, a pressure sensor 56, a controller 58 and a fixture 60. The controller 58 consists of a power box 61, a computer 63, and an electronic application box 65. Also electrically coupled to the computer 63 are a user interface monitor 67, a user interface keyboard/mouse 69, and a label printer 71. The automated Big Bag Calibrator 50 may also contain a machine guarding 73, a light stick 75 and a back edge bladder support 103. The back edge bladder support 103 will be explained below with FIG. 8.

In operation, the air bladder press cylinder 52 moves the bladder 54 up and out of the way so that a seat 80 can be loaded onto a fixture 60. The fixture 60 has an electronic contact block (not shown) and a locating post (not shown) that are common to seat tooling designs. When the seat 80 is properly loaded, an electrical connection is established between the PODS controller (not shown) contained within the seat 80 and the controller 58. Once the seat 80 is loaded, the air bladder press cylinder 52 then moves the air bladder 54 down on the seat 80. The air bladder press cylinder 52 maintains a force on an air bladder plate 62 great enough to keep the air bladder plate 62 from moving when air bladder pressure is increased. In a preferred embodiment, the air bladder press cylinder 52 has a 4" bore, a 7" stroke, and maintains a force of approximately 675 pounds at 50 psi in the extended state to emulate a rigid body. Therefore, when the air bladder 54 is inflated, the seat 80 and the air bladder 54 are the only components that move.

The air bladder 54 conforms to the contour of the seat 80 and applies pressure to the seat surface 81. Preferably, the air bladder 54 is made of a urethane-nylon laminate material to allow the air bladder 54 to slide on the seat surface and provide greater ability to conform to the seat contours. The size of the air bladder 54 is larger than the air bladder 14 in FIG. 1, and is approximately 26" by 26". The larger bladder 54 ensures complete coverage of the seat surface 81 with allowances for seat movement.

The pressure sensor 56 is coupled to a controller 64 that is capable of outputting pressure information to the controller 58 via a communication protocol. The pressure sensor 56 preferably has a full scale sensing capability of 0 to 1.5 psi with a typical accuracy of +/−0.5% of Full Scale which translates to 0.0075 psi. The pressure sensor 56 data is used to decide how much air to move in and out of the bladder 54.

Figure 4:
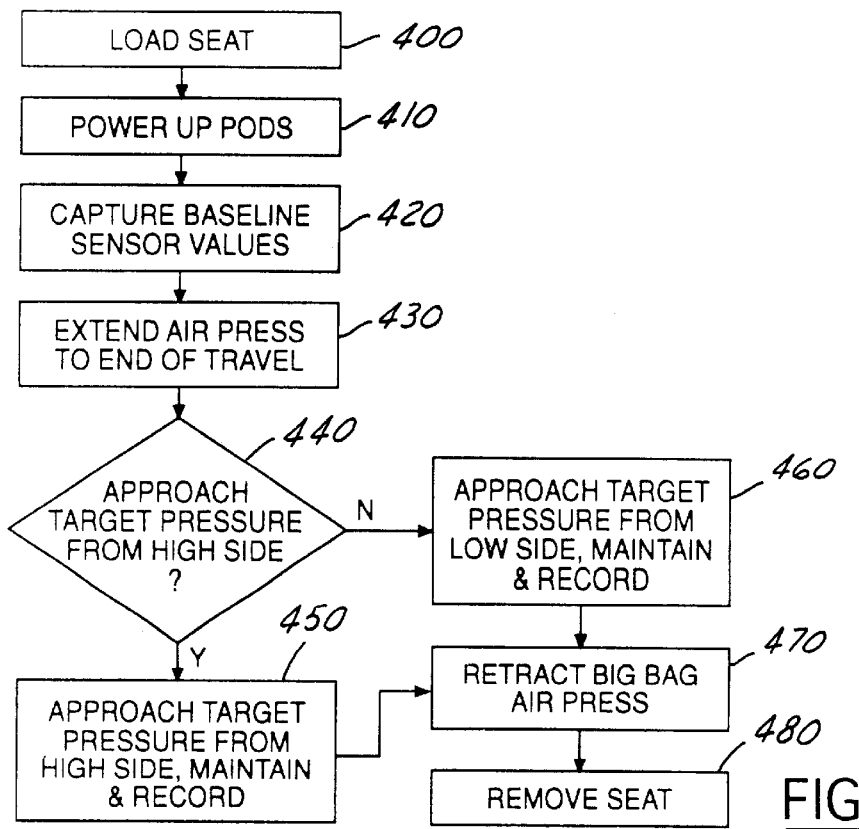
FIG. 4 is a logic flow diagram for the calibrating the seat sensors using a Big Bag Calibrator according to another preferred embodiment of the present invention.

Referring now to FIG. 4, a logic flow diagram with two ramp-up alternatives using an automatic Big Bag Calibrator 50 according to one preferred embodiment of the present invention is shown. In Step 400, a seat is loaded into a fixture 60 underneath the air press assembly, a cable is connected, with the seat harness, and the seat fixture is slid into position beneath the Big Bag Press assembly 52 such that the seat extends into the electrical contact block. Next, in Step 410, the Controller 58 is powered up by turning on the application box 65. Baseline sensor readings are recorded in the PODS controller in Step 420 prior to applying a load to the seat surface 81. A computer 63 is connected to the seat 80 and the controller 58 and is capable of capturing data from all the seat sensors 81 simultaneously.

In Step 430, the air press cylinder 52 is extended to its end of travel. The cylinder 52 exerts and maintains a force of approximately 675 lbs. at 50 psi in its extended state. Depending upon the volume of air left in the air bladder 54, a force may be exerted on the seat 80 at this time.

In Step 440, a determination is made as to how to drive the Big Bag Calibrator 50 to the target pressure. Two options are available. If the operator determines to approach the target pressure from the high side, proceed to step 450. If the operator determines to approach the target pressure from the low side, proceed to step 460.

In Step 450, the air bladder 54 pressure is directed by the computer 63 to be driven to its target pressure and maintained within the specified tolerances. At that time, the actuated sensor values from the pressure sensor 56 are recorded. Typically, when the air press cylinder 52 is extended and the air bladder 54 is contacted to the seat 80 there is usually enough air trapped in the air bladder 54 to generate a pressure greater than the target pressure. As the seat 80 is compressed under the load of the bladder 54, the air pressure in the bladder 54 decreases due to the increase in volume of the air bladder 54. To expedite the process, air is exhausted from the air bladder 54 until the target pressure is achieved. Once the actuated sensor values are recorded, the computer 63 creates a calibration table for the PODS controller that takes into account the baseline sensor values from Step 420 and the actuated sensor values from Step 450 which determine the responsive curve for each sensor. This calibration table is downloaded into the PODS controller memory. The calibration table is used by the PODS controller to correct raw sensor values. The PODS controller then uses the corrected sensor values and deflection pattern information to determine whether to deploy the air bag in crash situations. The logic then proceeds to Step 470.

In Step 460, the process proceeds similarly as in Step 450. However, in this scenario, when the air press cylinder 52 is extended and the bladder 54 contacts the seat 80, the volume of air is small enough such that the air trapped in the bladder 54 generates a pressure less than the target pressure. In this case, air is pumped into the bladder 54 to increase the air pressure to the target pressure. Once the target pressure is achieved and maintained within specific tolerances, actuated sensor values are recorded. The computer 63 then creates a calibration table that is sent to the PODS controller as described above. The logic then proceeds to Step 470.

In Step 470, the big bag air press cylinder 52 is retracted, and in Step 480 the seat is removed from the fixture 60 after powering down the controller 58 and disconnecting the cable.

FIGS. 5 and 8 illustrate two preferred embodiments that may be used by either of the Big Bag Calibrators as depicted in FIGS. 1 and 3 to calibrate passenger side seats 80 to aid in the deploying of passenger side airbags. In FIG. 5, the width of the bladder 14, 54 is set approximately equal with the depth of the seat 80 (from front to back), while in FIG. 8 a back edge bladder support 103 is added to remedy the problem if the bladder is positioned beyond the back edge of the seat 80, as depicted in FIG. 7. Also, FIG. 6 illustrates where the position of the bladder 14, 54 is too small.

FIG. 5 depicts a seat 80 placed in the Big Bag Calibrator 10, 50. The seat 80 is composed of, starting from the bottom, a sheet metal seat pan 82, seat foam 84, a sensor mat 86, an FCD 88, and a seat cover 90 (sometimes referred to as trim). The sensor mat 86 contains a bottom mylar sheet (not shown), a plurality of silver ink conductors 92, a resistor pad (not shown), and a top mylar sheet (not shown).

The position of the bladder 14, 54 is set wherein the rounded edge of the bladder 14, 54 extends beyond the back edge 101 of the seat 80 in all extremes of seat movement. This position is crucial for optimizing calibration.

To optimize sensor performance, the bladder 14, 54 position must be properly controlled. If the bladder 14, 54 position does not extend beyond the seat 80, as depicted in FIG. 6, a step 99 in the seat foam 84 is created. This step 99 in turn causes the sensor mat 86 to further wrap around the FCD 88. This causes more cracks (gaps) in the silver ink conductors 92, leading to a higher resistance value, which in turn causes the sensor value to increase, resulting in inaccurate sensor values which can affect air bag deployment.

Further, if the position of the bladder 14, 54 extends too far beyond the back edge 101 of the seat 80, as depicted in FIG. 7, the back edge 101 of the seat foam 84 is pulled down and the sensor mat 86 is flattened. Thus, the sensor mat is not properly wrapped around the FCD 88, and the silver ink conductors 92 will read lower than anticipated sensor values.

As shown in FIG. 5, in one preferred embodiment of the present invention, the position of the bladder 14, 54 is set wherein only the rounded edge of the bladder 14, 54 extends beyond the back edge 101 of the seat 80 in all extremes of seat movement. This ensures that the sensor mat 86 properly wraps around the FCD 88 for more consistent and repeatable sensor values.

In another alternative preferred embodiment, as shown in FIG. 8, a back edge bladder support 103 is added. The back edge bladder support 103 supports the bladder 14, 54 to prevent the sensor mat 86 from flattening as in FIG. 7. This is useful because it allows the same Big Bag Calibrator to be used for calibrating different sizes of seats without having to adjust the position of the bladder 14, 54.

This process eliminates the need for all of the indirect monitoring steps required for the prior art calibrators. Further, the process offers several advantages over the prior art. First, since the Big Bag Calibrator tests all seat sensors at one time, the cycle time for testing seat sensors is substantially reduced. Second, the Big Bag Calibrator is much simpler and less expensive to maintain than previous calibrators. The expensive steel base, robot, servo amplifiers, motion control cards, and related control software are replaced with an inexpensive base and air cylinder. Further savings are realized in associated maintenance, downtime, and training. Third, the Big Bag Calibrator is relatively insensitive to sensor registration because the air bladder extends well beyond the edges of a typical car seat. Fourth, since the air bladder is controlled directly, ambient temperature changes would not affect system performance. Fifth, the Big Bag Calibrator is easy to integrate into a wide variety of seat models, seat manufacturers, and seat assembly processes. Seats could be calibrated as individual seat bottoms, as full seats, or while on a pallet that contains a car's full complement of seats. These may be run off a single machine without significant hardware or software changes. Sixth, the Big Bag Calibrator directly and accurately controls the pressure applied to the seat surface, eliminating many unnecessary control problems.

While the invention has been described in terms of preferred embodiments, it will be understood, of course, that the invention is not limited thereto since modifications may be made by those skilled in the art, particularly in light of the foregoing teachings.

What is claimed is:

1. An air bag calibrator used for calibrating a plurality of sensors contained within a seat having a predetermined length and width, the air bag calibrator comprising:

an air bladder press plate;

an air bladder press cylinder;

an air bladder having a first length and a first width defining a first size;

a pressure sensor pneumatically coupled to said air bladder;

a PODS controller contained within the seat for reading a plurality of values from each of said plurality of sensors, said PODS controller capable of deploying an air bag in crash situations as a function of said plurality of values; and a computer electrically coupled to said PODS controller, said computer capable of calibrating each of said plurality of values within said PODS controller prior to deploying said air bag.

2. The air bag calibrator of claim 1, wherein said first size is a function of the predetermined length and width of the seat.

3. The air bag calibrator of claim 1, wherein said first length is substantially similar to the length of the seat and said first width is substantially similar to the width of the seat.

4. The air bag calibrator of claim 1 further comprising a back edge bladder support closely coupled to said air bladder and coupled to the seat.

5. The air bag calibrator of claim 1, wherein said air bladder is a urethane-nylon laminate air bladder.

6. The air bag calibrator of claim 4, wherein said first length is greater than the length of the seat and said first width is greater than the width of the seat.

7. A method for calibrating each of at least one seat sensors contained within a seat using an air bag calibrator, the method comprising the steps of:
   loading the seat having the at least one sensor onto the air bag calibrator;
   recording a sensor reading from each of said at least one sensor prior to actuation;
   extending an air press cylinder to a first position;
   directing an air bladder to a target pressure;
   recording an actuated sensor reading from each of the at least one sensors;
   calibrating a PODS controller as a function of each of said sensor readings and each of said actuated sensor readings; and
   retracting said air press cylinder and removing the seat.

8. The method of claim 7, wherein the step of directing an air bladder to a target pressure comprises the step of inflating an air bladder to a target pressure.

9. The method of claim 7, wherein the step of directing an air bladder to a target pressure comprises the step of deflating an air bladder to a target pressure.

10. The method of claim 7, wherein the steps of directing an air bladder to a target pressure and recording an actuated sensor reading from each of said at least one sensor comprises the steps of:
    inflating an air bladder to approach a target pressure;
    maintaining said target pressure for a predetermined amount of time; and
    recording an actuated sensor reading from each of said at least one sensor.

11. The method of claim 7, wherein the steps of directing an air bladder to a target pressure and recording an actuated sensor reading from each of said at least one sensor comprises the steps of:
    deflating an air bladder to approach a target pressure;
    maintaining said target pressure for a predetermined amount of time; and
    recording actuated sensor readings from each of said at least one sensor.

12. The method of claim 7, wherein the steps of directing an air bladder to a target pressure and recording an actuated sensor reading from each of said at least one sensor comprises the steps of:
    inflating an air bladder to approach a target pressure; and
    recording an actuated sensor readings from each of the at least one sensors.

13. The method of claim 7, wherein the steps of directing an air bladder to a target pressure and recording an actuated sensor reading from each of said at least one sensor comprises the steps of:
    deflating an air bladder to approach a target pressure; and
    recording an actuated sensor reading from each of said at least one sensor.

14. The method of claim 7, wherein the step of extending an air press cylinder to a first position comprises the step of extending an air press cylinder to a first position and exerting and maintaining a first force on the seat in said extended state.

15. The method of claim 14, wherein the step of extending an air press cylinder to a first position and exerting and maintaining a first force on the seat in said extended state comprises the step of extending an air press cylinder to the end of its travel and exerting and maintaining approximately a 400 pound force on the seat in said extended state.

16. The method of claim 14, wherein the step of extending an air press cylinder to a first position and exerting and maintaining a first force on the seat in said extended state comprises the step of extending an air press cylinder to the end of its travel and exerting and maintaining approximately a 675 pound force at 50 psi on the seat in said extended state.

17. The method of claim 7, wherein the step of loading the seat having the at least one sensor onto the big bag calibrator comprises the steps of:
    loading the seat having the at least one sensor and a seat harness onto a fixture located underneath said air press cylinder such that the seat extends into an electrical contact block; and
    connecting a cable to said seat harness.

18. A method of applying uniform pressure to all points on a seat surface to calibrate a PODS controller located within the seat surface, the PODS controller used to measure a plurality of seat sensors located within the seat surface to control the deployment of an air bag in crash situations, the method comprising the steps of:
    securing a seat to an air bag calibrator such that the seat surface is coupled with an air bladder coupled to an air press cylinder, said air bladder having a first air pressure, wherein the length and width of said air bladder are each larger than the length and width of the seat surface;
    recording a seat sensor value for each of the plurality of seat sensors prior to actuation;
    extending said air press cylinder to a first position;
    applying a first load pressure on said air press cylinder;
    adjusting the air pressure within said air bladder to reach a predetermined target pressure;
    maintaining said predetermined target pressure for a predetermined time interval;
    recording an actuated seat sensor value for each of the plurality of seat sensors at said predetermined target pressure; and
    calibrating the PODS controller as a function of each of said seat sensor values and each of said actuated seat sensor values.

19. The method of claim 18, wherein said first air pressure is less than said predetermined target air pressure.

20. The method of claim 18, wherein said first air pressure is greater than said predetermined target air pressure.

21. The method of claim 18, wherein said predetermined time interval is at least 30 seconds.

22. The method of claim 18, wherein said predetermined time interval is 0 seconds.

* * * * *